(12) United States Patent
Williamson (10) Patent No.: US 8,528,379 B2
(45) Date of Patent: Sep. 10, 2013

(54) METHOD AND APPARATUS FOR APPLYING TENSION TO FLEXIBLE ITEMS

(76) Inventor: Kirk Ernest Williamson, Stockdale, TX (US)

( * ) Notice: Subject to any disclaimer, the term of this patent is extended or adjusted under 35 U.S.C. 154(b) by 871 days.

(21) Appl. No.: 12/384,712

(22) Filed: Apr. 8, 2009

(65) Prior Publication Data
US 2010/0258212 A1    Oct. 14, 2010

(51) Int. Cl.
*B21D 11/02* (2006.01)
*B21D 11/14* (2006.01)
*B21F 7/00* (2006.01)
*B66F 3/00* (2006.01)

(52) U.S. Cl.
USPC ............ 72/301; 72/295; 72/299; 72/371; 140/149; 254/237

(58) Field of Classification Search
USPC ............ 72/295, 298, 299, 301, 371; 140/39, 140/45, 102.5, 108, 117, 120, 123, 123.5, 140/149; 254/230, 233, 234, 235, 237, 238, 254/239, 240
See application file for complete search history.

(56) References Cited

U.S. PATENT DOCUMENTS

| | | | | |
|---|---|---|---|---|
| RE8,032 E | * | 1/1878 | Shortau ............... | 72/305 |
| 261,706 A | * | 7/1882 | Harris ............... | 140/117 |
| 725,918 A | * | 4/1903 | Barnhill ............... | 254/237 |
| 902,764 A | * | 11/1908 | Rodgers ............... | 254/222 |
| 1,656,319 A | * | 1/1928 | Cowley ............... | 254/237 |
| 1,681,370 A | * | 8/1928 | Seeger ............... | 254/240 |
| 2,217,301 A | * | 10/1940 | Wennberg ............... | 140/149 |
| 2,570,575 A | * | 10/1951 | Lindbloom ............... | 140/102.5 |
| 2,604,883 A | * | 7/1952 | D'Avaucourt ............... | 125/12 |
| 2,937,851 A | * | 5/1960 | Greutman et al. ............... | 254/237 |
| 2,949,939 A | * | 8/1960 | Milla ............... | 140/115 |
| 3,716,079 A | * | 2/1973 | Marshall ............... | 140/120 |
| 3,825,228 A | * | 7/1974 | Greutman ............... | 254/237 |
| 6,105,937 A | * | 8/2000 | Hay ............... | 254/237 |

* cited by examiner

*Primary Examiner* — Dana Ross
*Assistant Examiner* — Lawrence Averick
(74) *Attorney, Agent, or Firm* — The Matthews Firm (57) ABSTRACT

An apparatus and method for applying tension to flexible items, including wire, barbed wire, cable, or rope, are described herein. A stationary clamping member is fixedly attached to a first end of a guide bar, extending outwardly therefrom, while a non-stationary clamping member is movably mounted to and extending outward from the guide bar substantially parallel to the stationary clamping member. The free end of a first flexible item is secured in the stationary clamping member, while the free end of a second flexible item is secured in the non-stationary clamping member. A tensioning assembly, such as a ratchet-like assembly engaging notches in the guide bar, is used to move the non-stationary clamping member away from the stationary clamping member, thereby tensioning one or both flexible items. Once the flexible items have been tensioned, they can be twisted together to form a connection without losing tension.

18 Claims, 6 Drawing Sheets

METHOD AND APPARATUS FOR APPLYING TENSION TO FLEXIBLE ITEMS

FIELD

The present invention relates, generally, to an apparatus and method of use for applying tension to flexible items, such as wire, barbed wire, cable, rope, or other flexible items.

BACKGROUND

A common difficulty when tensioning flexible items, most notably barbed wire, is the loss of tension when connecting two lengths of adjacent, tensioned flexible items together. It has long been a difficult problem in the art to bring two pieces of wire in close proximity, with enough overlap between the lines to allow the formation of a tight and secure connection therebetween, without creating slack and losing tension in either side of the lines when forming the connection.

The most common method of attachment between flexible items involves providing a sufficient quantity of slack, non-tensioned line from each flexible item, used to twist together at an attachment point, where a connection between lines is to be formed. The attachment point is normally located at or in close proximity to a device utilized to apply tension to one or both of the lines, with the slack line used to form the connection extending past the tensioning device. The free ends of two flexible items are normally pulled approximately even with one another, and the connection is then formed by twisting or clamping the slack portions of the lines together, or using other similar methods of attachment. The method used to connect the ends of two pieces of line is critical for maintaining tension in each line and preventing subsequent breaks in the lines. The two arrangements generally used to connect adjacent lines are commonly known as a figure eight arrangement, and the "Western Union Wrap."

A figure eight arrangement is formed by bending the free end of one line to form a loop, while wrapping a portion of the free end that extends past the loop around the opposing end of the line. The free end of the other line is passed through this loop, then same procedure is performed with the other line, to form two connecting loops between the lines. This type of connection is disadvantageous, as a crimp is often created in each loop when tension is introduced into the line, which can cause the line to break. While a reduced amount of tension can be introduced into the line to prevent breakage, this is highly undesirable, as insufficient tension along the flexible items can mitigate their effectiveness. However, use of appropriate tension can also lead to the creation of undesired slack in the line, as the introduction of tension can flatten and crimp the loops, which lengthens the line, thereby reducing the overall tension.

The Western Union Wrap is generally regarded as superior to the figure eight arrangement. To form this type of connection, approximately eight inches of two parallel lines are overlapped, and at the midpoint of the overlap, one of the lines is wrapped in a tight helix around the other. The second line is then wrapped in a tight helix around the first, again beginning at the midpoint of the overlap. The two helixes are continued in opposing directions. When tension is introduced to the line, the two helixes pull against each other in opposition, which tightens the helixes and completes the connection. This type of connection generally does not cause crimping and is much less susceptible to breakage or the generation of slack when compared to the figure eight arrangement. However, use of the Western Union Wrap still requires engagement of the non-tensioned, slack ends of each line, which always introduces some amount of slack once the connection is made, as the tension maintained on the remainder of the lines must be distributed over the non-tensioned portions of line used to from the connection.

Existing tensioning apparatuses include devices such as the Durbans Red-D-Rod, and similar devices that are designed to pull flexible items toward one another. This method results in at least some slack being maintained in the lines, since devices of this type are only able to apply tension up to the point where the connection is to be made, without pulling the lines past one another. Then, slack portions of the lines are used to form the connection, as described above, rather than tensioned portions of line. Additionally, once the connection is made and the flexible items are released from the apparatus, the lack of tension immediately adjacent to the connection is transferred and distributed throughout the connected items.

A need exists for an apparatus and method usable to apply tension to flexible items that improves upon existing methods and devices by providing tension at the point of connection between adjacent flexible items in excess of what is possible using existing devices and methods.

A further need exists for an apparatus and method usable to pull adjacent lines past one another, rather than simply even with one another, to provide additional tension.

A need also exists for an apparatus and method able to compensate for the torque that occurs within lines during the application of tension, thereby enabling tension to be applied in excess of what is normally possible.

The present invention meets these needs.

SUMMARY

The apparatus and method of the present invention provide for the connection of flexible items, such as wire, barbed wire, cable, rope, or other similar items, to form a secure engagement therebetween. Embodiments of the present invention utilize continuous tension applied to the free ends of either or both of the flexible items, thereby pulling the free ends of the flexible items past one another, until a sufficient overlap between the two lines exists to complete a connecting wrap between the lines. The present apparatus and method are usable to control the amount of tension provided to one or more lines, to control the direction of the lines relative to one another, and to control the torque created on the flexible items due to their respective directions relative to one another and the tension applied. The present apparatus and method thereby position the tensioned lines in an orientation that permits a connecting wrap to be formed under tension.

Tension is provided to the flexible items by axially extending the free end of one line, or of two lines sequentially or simultaneously, while maintaining the other end of the lines in a fixed position. The lines are extended past one another until sufficient overlap exists between the lines to form a connection. Once the two lines are sufficiently extended, a rotational wrapping motion between the lines can be used to provide additional tension. To move the free ends of one or both flexible items away from each other, a tensioning assembly can be used. In a preferred embodiment of the present invention, the tensioning assembly can include a ratchet device, though in other embodiments of the invention, a pulley, lever, or similar device could be used to move the free end of one or both lines. When two lines are to be connected to one another, the connection is made while the two lines are under tension by rotating the lines about each other. Forming a connection in this manner further increases the tension on each line compared to conventional connection methods that utilize slack portions of adjacent lines to form connecting wraps.

The preferred embodiment of the present invention retains two flexible objects, which are intended to be connected to one another, using clamping members attached to either end of a guide bar. One of the clamping members is stationary, being fixedly mounted to an end of the guide bar, while the other clamping member is non-stationary, being designed to move laterally along the guide bar, away from the stationary clamping member. The non-stationary clamping member pulls the free end of one flexible item past the stationary clamping member, to which the other flexible item is affixed, thereby pulling the ends of each line past one another, and in opposite directions from each other. This movement produces tension in both flexible items extending from the clamping members to the first fixed point of each line, in excess of what is normally provided through conventional tensioning devices, forming an overlapping portion between the lines sufficient to connect the lines together.

Normally, the introduction of tension to the flexible items causes torque, resulting from the pull from each line at each connection point. If the torque is not controlled, the force can cause the apparatus to flip, thereby reversing the position of the clamping members and creating slack in the lines. To alleviate this potential difficulty, an embodiment of the invention can include line guides affixed to one or more of the clamping members, extending perpendicular to and outward from the clamping members. The line retained by the stationary clamping member passes through the guide attached to the non-stationary clamping member, while the line retained by the non-stationary clamping member passes through the guide attached to the stationary clamping member. The two line guides work in opposition to apply equal and opposite forces to counter the torque on the lines, while in turn canceling the force applied by the other line guide. The torque moment on the lines is thereby cancelled, and the creation of additional slack on the lines is thereby avoided.

The design of the apparatus thereby places the two flexible objects in an optimal plane, and separated by an optimal distance, for forming a connection using a Western Union Wrap. The flexible objects can also be provided with additional twisting to complete the connection. The connection is made between the overlapping portions of the lines extending between the two clamping members of the apparatus, thereby enabling tension to be maintained up to the point where connection is made. The accompanying twisting used to complete the connection shortens both lines and increases the tension therein, thereby eliminating any loss of tension that occurs when the clamping members are released.

In an embodiment of the invention, a locking, ratchet type assembly can be used to move the non-stationary clamping member away from the stationary clamping member, to pull one of the lines past the other to form an overlap. The guide bar can include a plurality of notches formed in a side, angled away from the stationary clamping member. A ratchet tongue engaged with the non-stationary clamping member is used to engage and disengage selected notches. The assembly can further include a ratchet safety that engages with the notches to push the guide bar and, correspondingly, the stationary clamping member away from the non-stationary clamping member, thereby preventing a loss of tension in either flexible item during movement of the non-stationary clamping member. A tensioning member, such as a spring, can engage the ratchet tongue, to maintain the ratchet tongue in constant engagement with the plurality of notches, except when intentionally disengaged.

In use, the present apparatus pulls one of the two free ends of a clamped flexible item past the free end of another, then in an opposing direction relative to the other line, by moving the non-stationary clamping member away from the stationary clamping member. Use of a locking, ratchet type system prevents slippage and reduction in tension of the lines after each advancement of the ratchet tongue is made. Once the two lines are pulled past one another and positioned such that they overlap each other, they can be wrapped together by inserting a lever therebetween and rotating the lever, thereby twisting the lines about each other and providing additional tension to the connection. The force required to rotate the lever is inversely proportional to the length the lever extends beyond the plane in which both of the flexible items are located. The length of the lever is restricted by the distance between the lines to be connected and the tensioning mechanism and/or any adjacent lines above or below the lines being connected.

In an embodiment of the invention, the lever used to twist the lines together can include a tapered sleeve inserted between the two flexible items to create a pivot point. The tapered sleeve can have the same internal diameter throughout its length, and an outer diameter that tapers in one direction from one end to the other end. This taper allows the sleeve to be removed from between the two flexible items after they have been wrapped with less difficulty than would otherwise be incurred. A lever, such as a solid bar six inches in length, having a diameter less than the inner diameter of the sleeve, can be inserted into the sleeve and rotated to wrap the lines. A second bar of equal size can be inserted into the opposite end of the sleeve and used when the rotational travel of the first bar is terminated by contact with the guide bar that extends between the two clamping mechanisms used to retain the lines. Use of two bars to twist the lines together allows less force to be used to form the connection, and enables a greater amount of twisting to be provided to the lines, thereby removing as much slack as possible.

In a further embodiment of the invention, the stationary clamping member can be removable from one end of the guide bar and positioned at the opposite end. The non-stationary clamping member can then be inverted, and the apparatus can be used to pull a line from one clamping member toward the other, which can be secured to a point on the line beyond that where a connection is to be formed. A hook can be formed on an end of the guide bar to enable the apparatus to be readily attached to a fixed point, so that a free end of a single line can be drawn toward that point, in lieu of or in addition to using a second line secured in the stationary clamping member.

The present invention thereby enables connections to be formed between flexible items while virtually eliminating slack in the lines, providing an exceptional advantage over existing devices and methods for connecting flexible items to one another. The present invention pulls the free end of one line past that of another line, to apply tension in excess of what is normally possible, forming a tensioned overlap between adjacent lines usable to form a connecting wrap therebetween. Concurrently, two line guides are used to apply equal and opposite forces to the lines to prevent the resulting torque caused by the application of tension from inverting the apparatus and creating slack in the lines. By moving the ends of the lines past one another and compensating for the torque inherent in the tensioning process, the present invention exceeds the tensioning ability of conventional tensioning apparatuses.

BRIEF DESCRIPTION OF THE DRAWINGS

In the detailed description of the embodiments of the invention presented below, reference is made to the accompanying drawings, in which.

The depicted embodiments of the invention are described below with reference to the listed Figures.

DETAILED DESCRIPTION OF THE EMBODIMENTS

Before explaining the present invention in detail, it is to be understood that the present invention is not limited to the particular embodiments described and depicted and that the present invention can be practiced or carried out in various ways.

As described previously, the two generally accepted types of connections used to attach wire, barbed wire, cable, rope, or other flexible items, include the Western Union Wrap and the figure eight arrangement. FIG. 1B depicts the figure eight arrangement, which is formed by bending a free end (10) of a first line (11) to form a first loop (12), while retaining a sufficient length of the first line (11) extending past the first loop (12) to form a number of wraps (14) around the fixed end (16) of the first line (11). The same procedure is then utilized after the free end of a second line (17) has been passed through the first loop (12). The second line (17) is used to form a second loop (18), which interlocks with the first loop (12), then additional wraps (14) are provided around the anchored end (19) of the second line (17). The fixed and/or anchored ends (16, 19) of the lines (11, 17) can be attached at a number of locations, including a post, anchor, or other lines. As described previously, this type of connection can create crimps in the loops (12, 18) as tension is introduced into the lines (11, 17), which can result in breakage of either line should the applied tension exceed the tolerance at any specific point along the connection.

Figure 1A:
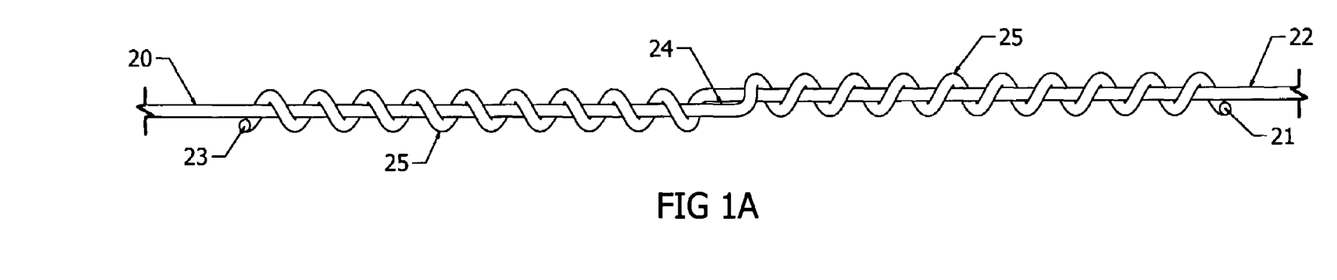
FIG. 1A depicts two flexible items engaged in a Western Union Wrap.
Figure 1B:
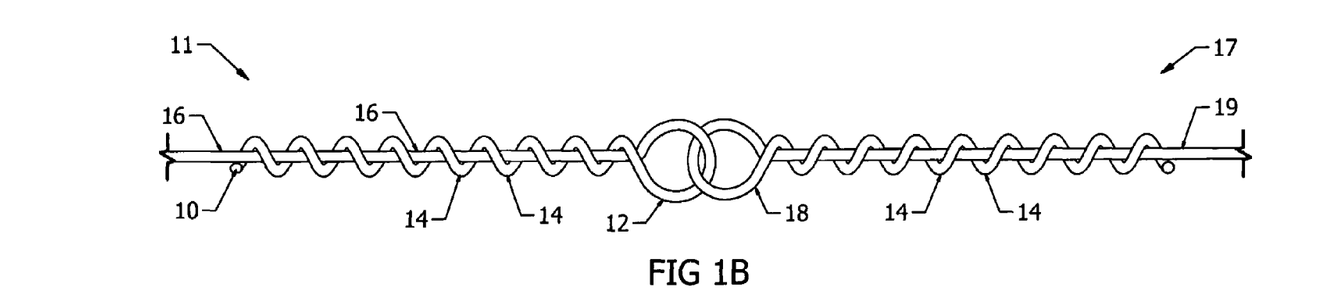
FIG. 1B depicts two flexible items engaged in a figure eight arrangement.

FIG. 1A depicts a Western Union Wrap, which is generally regarded as a superior connection to the figure eight arrangement. The Western Union Wrap is formed by overlapping a first line (20) and a second line (22). Beginning at the midpoint (24) of the overlap, the free end (21) of the first line (20) is wrapped around the anchored end of the second line (22), and the free end (21) of the second line (22) is wrapped around the anchored end of the first line (20). A number of wraps (25) are thereby formed, which should be sufficient in number to support the amount of tension to be introduced into the lines (20, 22). When tension is introduced into the lines (20, 22), the wraps (25) pull against each other in opposition, thereby tightening to complete the connection.

Figure 2:
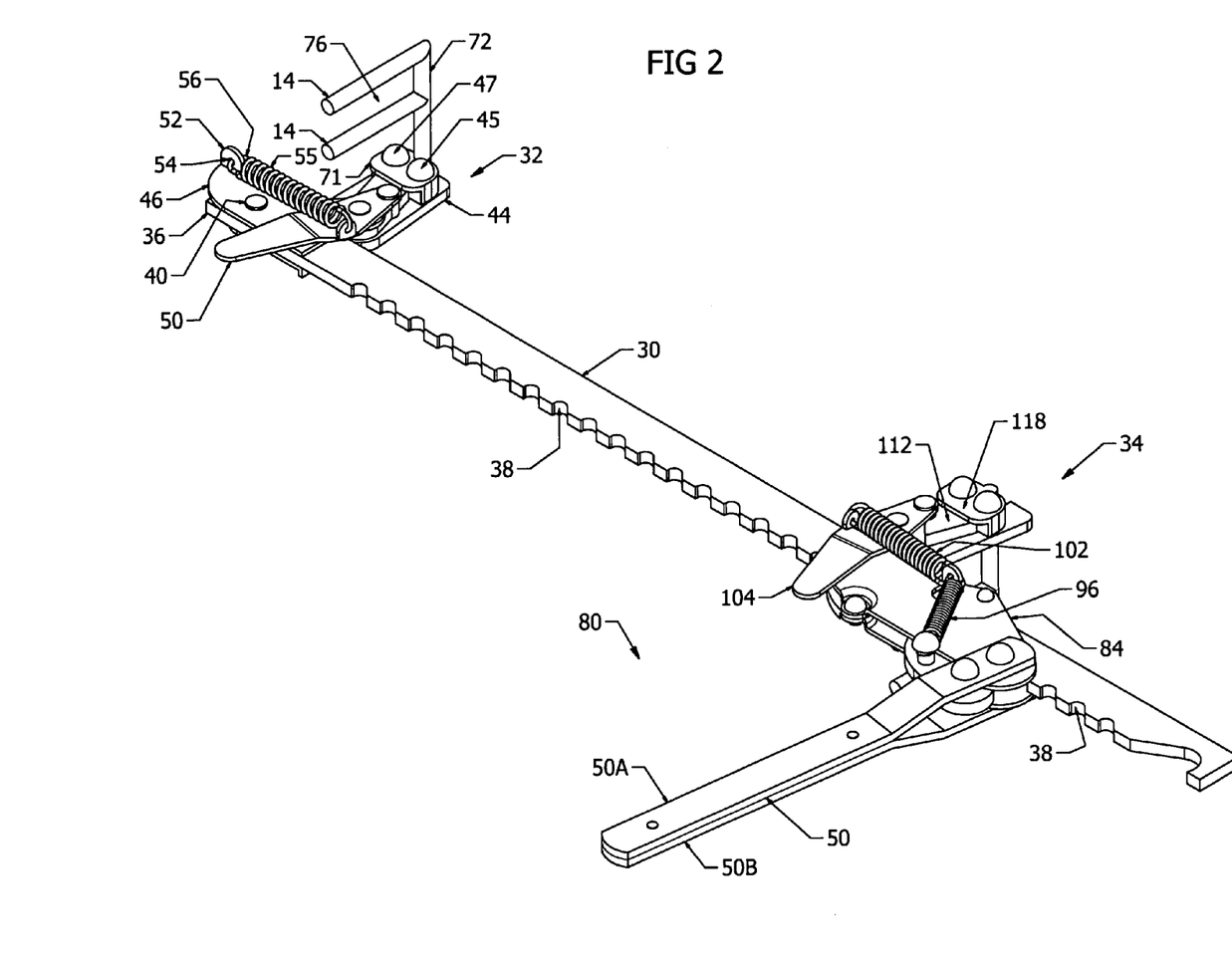
FIG. 2 depicts an embodiment of the present apparatus.
Figure 3:
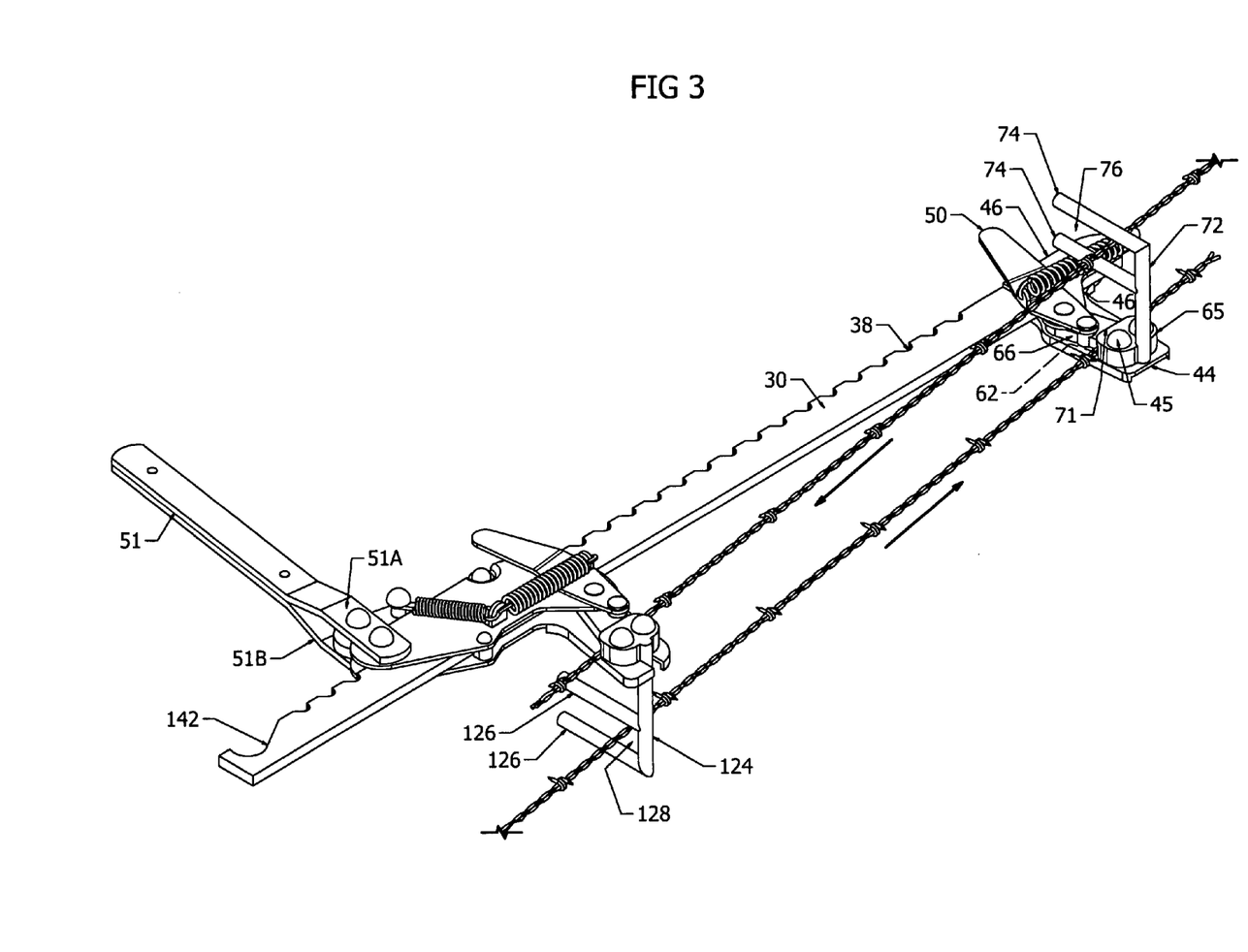
FIG. 3 depicts the apparatus of FIG. 2 engaged with two flexible items.

Referring now to FIGS. 2 and 3, an embodiment of the present apparatus is depicted. FIG. 2 depicts the apparatus at rest, while FIG. 3 depicts the apparatus in operation, engaged with two lines of barbed wire.

The apparatus is shown having a guide bar (30), which extends between a stationary clamping member (32) and a non-stationary claming member (34). The stationary clamping member (32) is fixedly secured to an end (36) of the guide bar (30). The non-stationary clamping member (34) can be moved along the guide bar (30) using a ratchet mechanism, which is shown including a ratchet lever (50), usable to engage and disengage a ratchet finger (60) from a plurality of notches (38) formed within one side of the guide bar (30). The notches (38) are shown formed on the side of the guide bar (30) opposite the side from which the stationary clamping member (32) extends, and can be angled away from the stationary clamping member (32).

Figure 4:
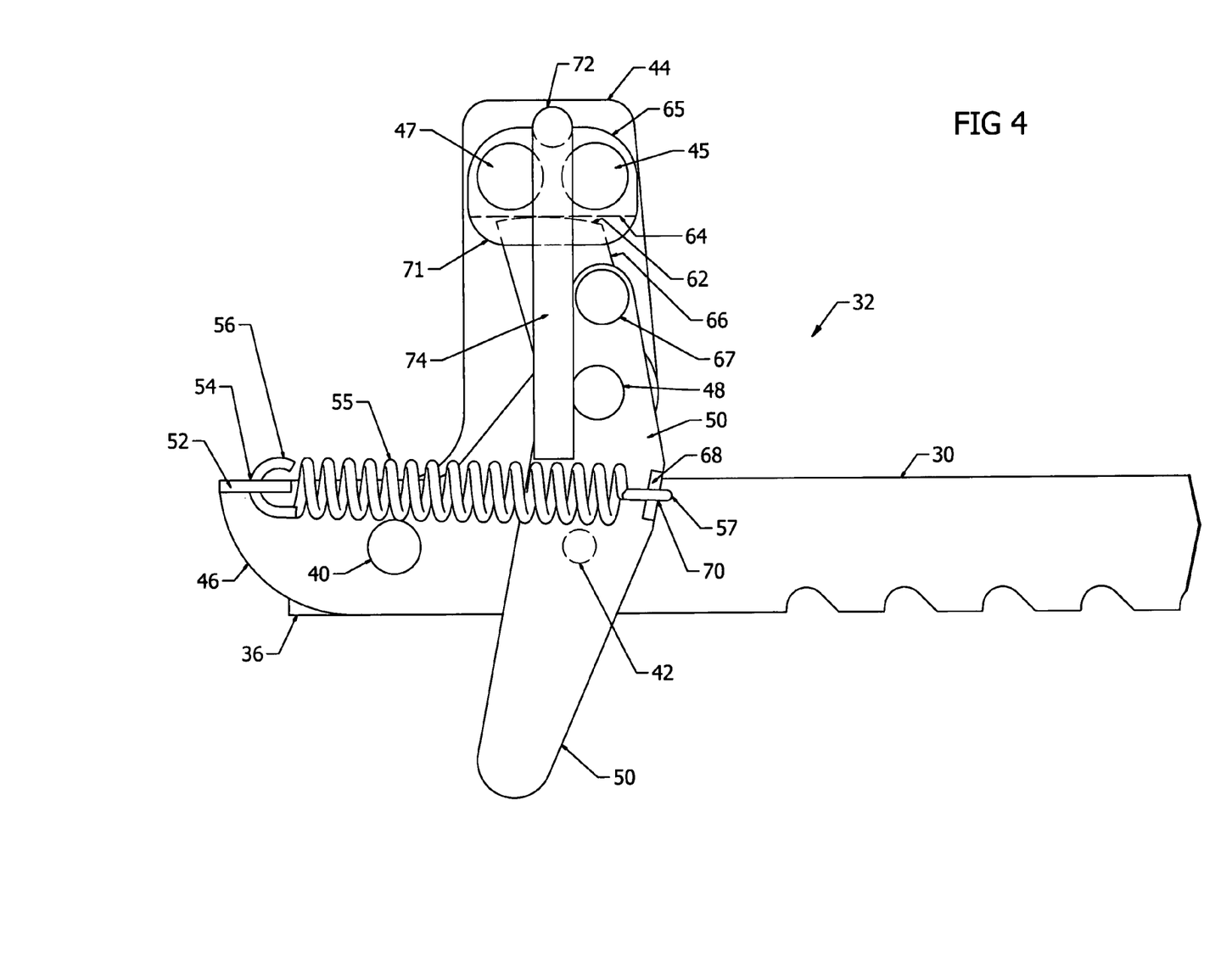
FIG. 4 depicts a top view of an embodiment of a stationary claming mechanism having an attached line guide.

FIG. 4 depicts an embodiment of the stationary clamping member (32), which is shown fixedly attached to the guide bar (30) at a first point (40) and a second point (42). While FIG. 4 depicts the stationary clamping member (32) attached at two attachment points (40, 42) using rivets or similar members, other connection methods, such as welding, nuts and bolts, or other suitable means for anchoring the stationary clamping member (32) to the guide bar (30) can be used, at any number of attachment points. The stationary clamping member (32) is shown having a bottom mounting plate (44) and a top mounting plate (46), which are each connected to the guide bar (30) at the attachment points (40, 42). The top mounting plate (46) extends longitudinally toward the end (36) of the guide bar (30) and perpendicularly upward from the guide bar (30) to provide a pivot connection point (48) at which a clamping lever (50) is engaged.

A spring anchor (52) is shown extending perpendicularly outward from a side of the guide bar (30) and the top mounting plate (46). The spring anchor (52) has an aperture (52) therethrough, which enables a hook (56) of a spring (55) to be engaged. A second spring anchor (68) with an aperture (70) therethrough, extends from the clamping lever (50) to engage a second hook (57) of the spring (55). The spring (55) is utilized to maintain pressure on the clamping lever (50), which maintains a first clamping plate (62) and a second clamping plate (64) in abutment. The clamping plates (62, 64) maintain a flexible item therebetween when in abutment. The clamping lever (50) is fixedly attached to a clamping piece (66) of the stationary clamping member (32), proximate to the second clamping plate (64) at an attachment point (67). By maintaining the clamping lever (50) under tension, the spring (55) maintains the first clamping face (62) in abutment with the second clamping face (64). The second clamping face (64) is secured to the bottom mounting plate (44) at a first connection point (45) and a second connection point (47), which can include use of welds, rivets, nuts, bolts, or similar suitable items.

A safety lip (71) is shown extending over the point of abutment for the clamping faces (62, 64), integrally attached to the second clamping face (64) and support body (65). The safety lip (71) protects a user of the device and facilitates retention of a flexible item between the clamping faces (62, 64). FIG. 4 also depicts a line guide (72), having one or more guide arms (74), attached to the bottom mounting plate (44) at the connection points (45, 47). The line guide (72) extends perpendicularly outward from the bottom mounting plate (44) on the same side as the spring (55) and clamping lever (50). The guide arm (74) provides a bounded area (depicted in FIG. 2 at 76) within which flexible items can be placed, the guide arm (74) countering the torque produced in the flexible item concurrent with the application of tension.

Figure 5:
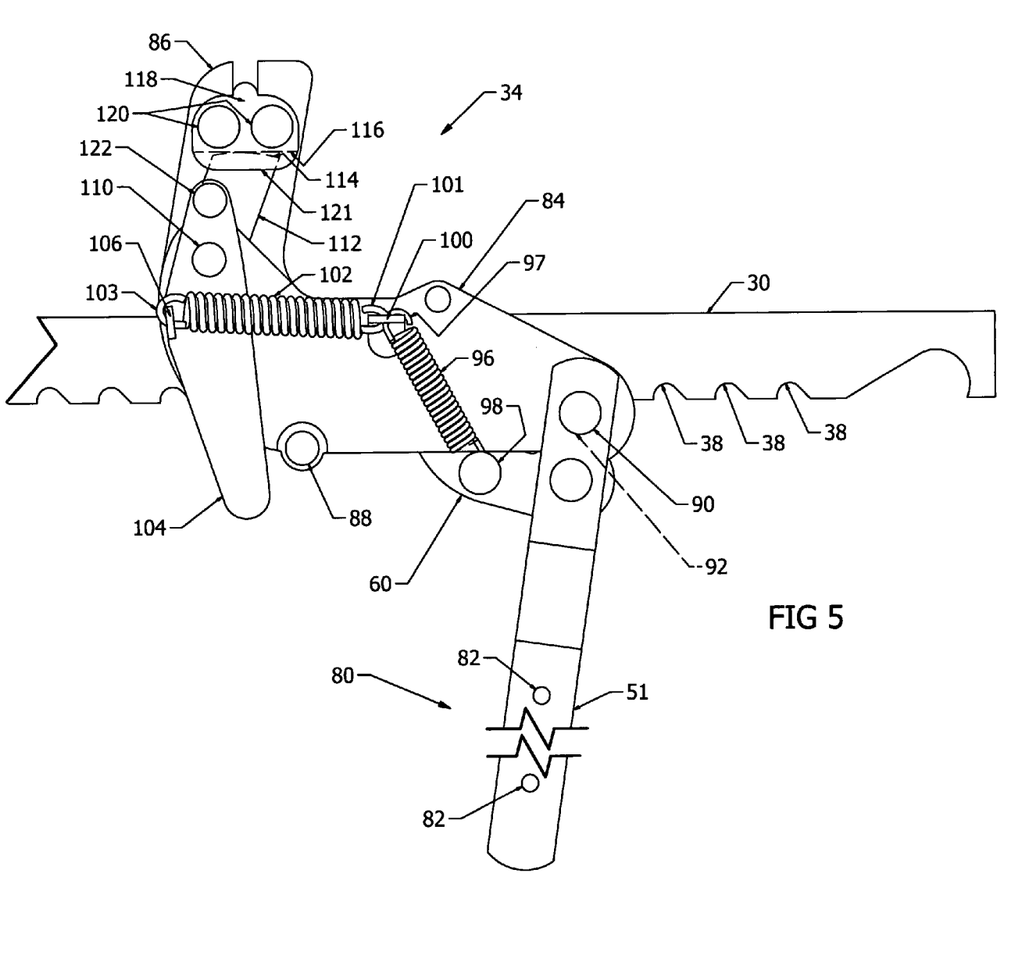
FIG. 5 depicts a top view of an embodiment of a non-stationary clamping mechanism having an attached line guide.

FIG. 5 depicts an embodiment of the non-stationary clamping member (34), which is operably moved along the guide bar (30) using a ratchet lever (51). The ratchet lever (51) is shown formed from two steel plates, which are engaged together at engagement points (82) to form a handle (80). The main body of the non-stationary clamping member (34) is shown having a top mounting plate (84) and a bottom mounting plate (86), which are fixedly attached together at an attachment point (88), such a by use of welding, rivets, or other suitable means of attachment. The ratchet lever (51) is attached to both mounting plates (84, 86) using a rivet (92), bolt, screw, or similar object to extend through the lever (51) and both mounting plates (84, 86), at a pivotable connection point (90). The connection between the lever (51) and mounting plates (84, 86) enables the lever (51) to rotate and pivot about the connection point (90).

Figure 6:
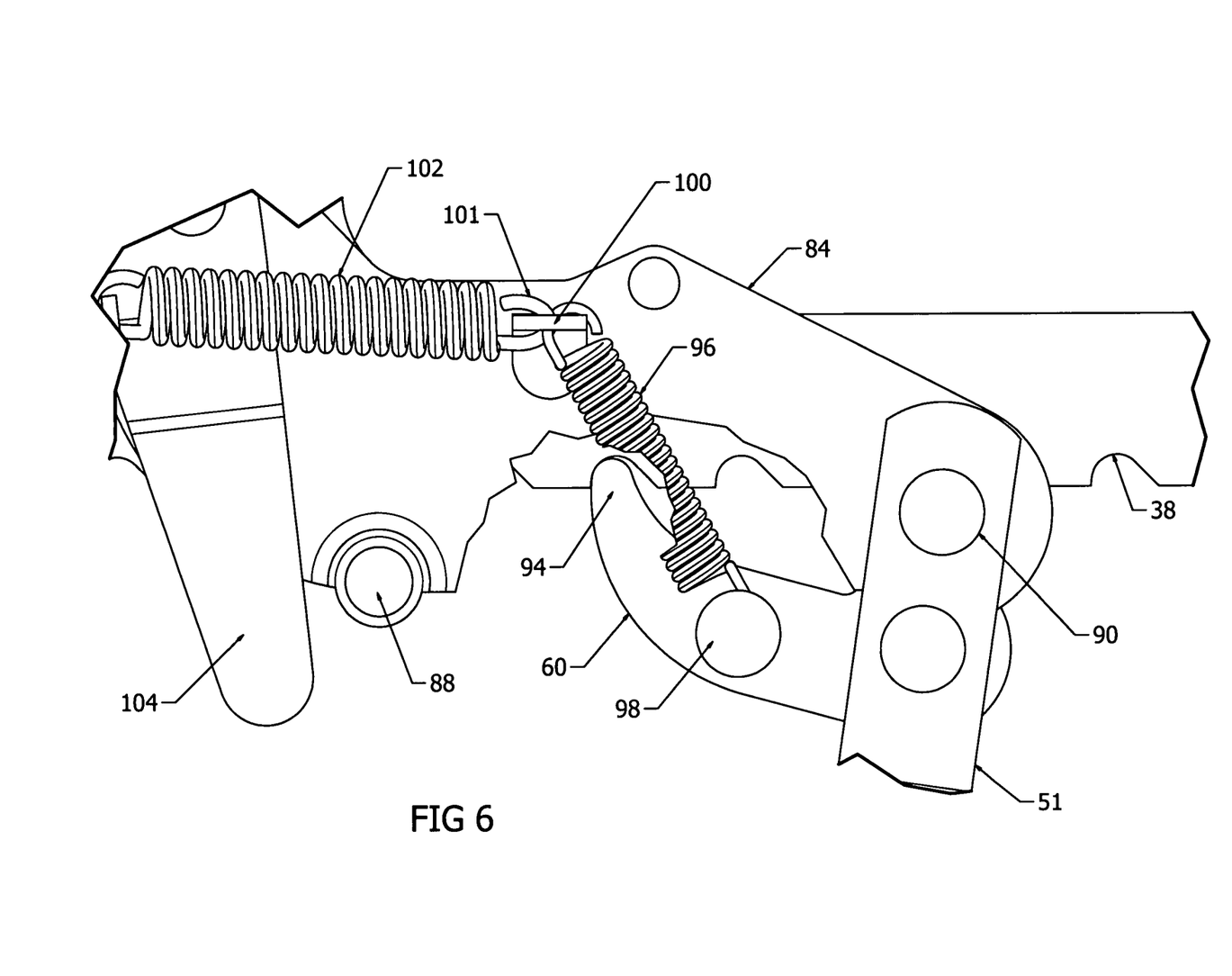
FIG. 6 depicts a top view of a ratchet mechanism usable with the present apparatus to tension attached flexible items.

The rivet (92) or other object used to secure the connection point (90) is usable as a ratchet tongue, which sits within notches (38) in the guide bar (30). To move the non-stationary clamping member (34) along the guide bar (30), the ratchet lever (51) is pivoted about the connection point (90), which pulls a ratchet safety mechanism (60), pivotably mounted between the steel plates of the lever (51), extending into the top and bottom mounting plates (84, 86). The ratchet safety mechanism (60) is depicted in greater detail in FIG. 6. The ratchet safety mechanism (60) is shown having a tongue (94), which is retained in engagement with the notches (38) of the guide bar due to tension provided by a ratchet spring (96). The ratchet spring (96) is anchored to the ratchet safety mechanism (60) at a first end (98) and through a spring anchor (100) in the top mounting plate (84) at a second end (97). Pivoting of the ratchet lever (51) thereby pulls the ratchet safety mechanism (60), enabling disengagement of the tongue (94) from a first notch and subsequent engagement with a different notch, while simultaneously enabling disengagement of the ratchet tongue (92) from its respective notch and subsequent engagement with a notch farther along the guide bar (30).

The first end (101) of a clamping spring (102) is also engaged with the spring anchor (100) on the top mounting plate (84). The second end (103) of the clamping spring (102) is engaged with a second spring anchor (106) disposed on a clamping lever (104). The clamping lever (104) is pivotably mounted outside of the top mounting plate (84) at a pivot point (110). A clamping arm (112) of the non-stationary clamping member (34) is attached to the clamping lever (104) at the pivot point (110) and at a connection point (122). A first clamping face (114) is formed at the end of the clamping arm (114), which abuts against a second clamping face (116), secured to the bottom mounting plate (86) at two connecting points (118, 120). When in abutment, the clamping faces (114, 116) retain a flexible item to which tension is to be applied. The clamping spring (102) retains the clamping faces (114, 116) in abutment by applying constant tension to the clamping lever (104), while the clamping lever (104) can be manually pivoted to enable engagement of a flexible item between the clamping faces (114, 116).

A line guide (124, depicted in FIGS. 2 and 3), extends perpendicularly from the bottom mounting plate (86), in the opposite direction from the line guide (72, depicted in FIGS. 2-4) extending from the stationary clamping member (32, depicted in FIGS. 2-4). The line guide (124) includes one or more guide arms (126), which form a bounded area (128) within which a flexible item is extended. The line guide (124) counters the torque produced when the flexible item is tensioned. The force of each line guide (72, 124) exerted to counter the torque from the lines is cancelled by that exerted by that exerted by the opposing line guide.

The preferred embodiment of the present invention is depicted in operation in FIG. 3. The loose end of a first piece of barbed wire that is to be connected with a second piece of barbed wire is shown extending between the guide arms (74) of the line guide (72) attached to the stationary clamping member. The loose end of the first piece of barbed wire is then clamped between the clamping faces of the non-stationary clamping member. In an embodiment of the invention, the clamping faces can be knurled. In a further embodiment of the invention, the clamping faces can be curved away from the outer point of the corresponding ends of the guide bar (30).

The free end of the second piece of barbed wire is shown extending between the guide arms (126) of the line guide (124) attached to the non-stationary clamping member. The second piece of bared wire is then clamped between the clamping faces of the stationary clamping mechanism.

Once each piece of barbed wire is engaged between the clamping faces of one of the clamping mechanisms, the ratchet lever (51), which is shown engaged with the non-stationary clamping member using two steel plates (51A, 51B) that each engage one side of the non-stationary clamping member, can be moved back and forth in opposite directions, thereby engaging the ratchet tongue into notches (38) along the guide bar (30). During operation, this movement of the ratchet lever (51) moves the entire non-stationary clamping member along the guide bar (30), thereby pulling the engaged line past the free end of the line engaged with the stationary clamping member and applying tension to both lines of barbed wire.

Figure 7:
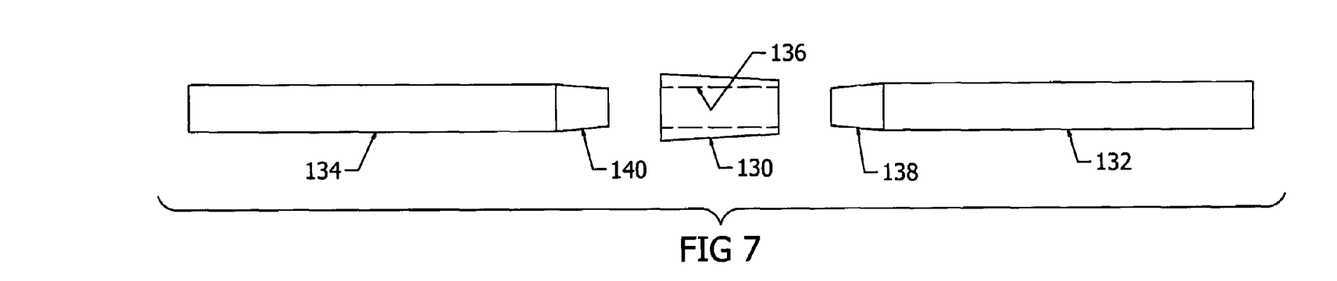
FIG. 7 depicts a lever usable with the present apparatus to form a connection between flexible items.

Once the proper tension has been applied to the lines, a lever can be used to form the connection between the two flexible items. FIG. 7 depicts an embodiment of a lever usable for this purpose. The embodied lever is shown having a tapered sleeve (130) having a cylindrical internal aperture (136) extending completely therethrough, and a tapered outer diameter. The taper of the sleeve (130) facilitates removal of the sleeve from between two lines after forming a connection. A first bar (132) having a first tapered end (138), and a second bar (134) having a second tapered end (140) are inserted into opposing sides of the cylindrical aperture (136) of the sleeve (130). The tapered ends (138, 140) of the bars (132, 134) facilitate a snug fit within the aperture (136).

Once the sleeve (130) has been inserted between lines to be connected and the bars (132, 134) have been inserted into the sleeve (130), the sleeve (130) can be twisted using the bars (132, 134), which forms a Western Union Wrap between the lines being connected. The bars (132, 134) are removable from the sleeve (130) during operation, because when rotated, the bars (132, 134) will contact the guide bar of the apparatus and will need to be removed to allow the twisting of the connection to continue.

FIG. 3 also depicts a hook (142) integrally formed within the guide bar (30) at the end closes to the non-stationary clamping member. The hook (142) enables the apparatus to be engaged with an anchor, while a single flexible item can be tensioned to a fixed object by pulling the flexible item away from the hook (142) using the non-stationary clamping member.

The present invention, including the embodiments of the invention described above, thereby provide a new and improved apparatus and method for applying tension to flexible items and making connections between the flexible items, in a manner that minimizes loss of tension and introduction of slack during formation of the connections.

While the present invention has been described with emphasis on the embodiments depicted and described above, it should be understood that within the scope of the appended claims, the present invention can be practiced other than as specifically described herein, and that the appended claims are intended to include all such alternatives, modifications, and variations that fall within the spirit of the invention and scope of the claims.

What is claimed is:

1. A method for applying tension to at least two flexible items, the method comprising the steps of:
   securing a first flexible item to a stationary clamping member;
   securing a second flexible item to a non-stationary clamping member, thereby creating an area between the non-stationary clamping member and the stationary clamping member in which the first flexible item and the second flexible item overlap;
   moving the non-stationary clamping member away from the stationary clamping member, thereby applying tension to the first flexible item and the second flexible item such that a portion of the first flexible item and a portion of the second flexible item within the area between the non-stationary clamping member and the stationary clamping member is under tension.

2. The method of claim 1, wherein the step of moving the non-stationary clamping member away from the stationary clamping member comprises moving an end of the second flexible item secured to the non-stationary clamping member away from an end of the first flexible item secured to the stationary clamping member, thereby creating the area between the non-stationary clamping member and the stationary clamping member wherein the first flexible item and the second flexible item are under tension.

3. The method of claim 1, further comprising:
   placing the first flexible item within a first line guide fixably mounted to the non-stationary clamping member; and
   placing the second flexible item within a second line guide fixably mounted to the stationary clamping member.

4. The method of claim 1, further comprising the steps of:
   rotating the at least one of the first and second flexible items about the other of the first and second flexible items to form a connection between the first flexible item and the second flexible item within the area between the non-stationary clamping member and the stationary clamping member in which the first flexible item and the second flexible item overlap.

5. The method of claim 3, further comprising the steps of:
   abutting the first flexible item with the first line guide to counter torque produced by the first flexible item during application of tension to the first flexible item; and
   abutting the second flexible item with the second line guide to counter torque produced by the second flexible item during application of tension to the second flexible item, wherein the first line guide and the second line guide prevent relative rotational movement between the stationary clamping member and the non-stationary clamping member.

6. The method of claim 3, wherein the step of moving the non-stationary clamping member away from the stationary clamping member comprises:
   moving at least one of the first line guide and the first flexible item in an axial direction relative to the other of the first line guide and the first flexible item;
   moving at least one of the second line guide and the second flexible item in an axial direction relative to the other of the second line guide and the second flexible item; or combinations thereof.

7. The method of claim 4, wherein rotating the at least one of the first and second flexible items about the other of the first and second flexible items comprising the steps of:
   placing a lever between the first flexible item and the second flexible item within the area between the non-stationary clamping member and the stationary clamping member in which the first flexible item and the second flexible item overlap;
   rotating the lever to twist the first flexible item and the second flexible item together until the first flexible item and the second flexible item are connected such that the first flexible item and the second flexible item will remain connected after disengagement of the stationary clamping member and the non-stationary clamping member; and
   unclamping the stationary clamping member and the non-stationary clamping member from the first flexible item and the second flexible item.

8. A method for applying tension to at least two flexible items, wherein each of said at least two flexible items comprises a first end and a second end, the method comprising the steps of:
   moving the first end of the first flexible item in a first direction toward the first end of the second flexible item;
   extending the first end of the first flexible item past the first end of the second flexible item, thereby forming an overlapping region between the first flexible item and the second flexible item; and
   applying tension to a portion of the first flexible item and the second flexible item in the overlapping region by moving the first end of the first flexible item in the first direction away from the first end of the second flexible item.

9. The method of claim 8, further comprising the steps of:
   providing a first guide in association with the first flexible item, wherein contact between the first guide and the first flexible item reduces lateral movement of the first flexible item relative to the second flexible item, and wherein the first guide allows movement of the first flexible item through the first guide; and
   providing a second guide in association with the second flexible item, wherein contact between the second guide and the second flexible item reduces lateral movement of the second flexible item relative to the first flexible item, and wherein the second guide allows movement of the second flexible item through the second guide.

10. The method of claim 8, wherein the step of applying tension to the portion of the first flexible item and the second flexible item in the overlapping region comprises:
    engaging the first end of the first flexible item with a stationary clamping member;
    engaging the first end of the second flexible item with a non-stationary clamping member movable relative to the stationary clamping member, thereby forming the overlapping region between the first flexible item and the second flexible item; and
    moving the non-stationary clamping member away from the stationary clamping member to move the first end of the second flexible item away from the first end of the first flexible item to apply tension to the first flexible item and the second flexible item in the overlapping region.

11. The method of claim 8, wherein the step of applying tension to the portion of the first flexible item and the second flexible item in the overlapping region by moving the first end of the first flexible item away from the first end of the second flexible item comprises:
    engaging a ratchet tongue of a non-stationary clamping member connected to the first end of the first flexible item with a notch of a plurality of notches formed within a guide bar; and moving the non-stationary clamping member along the guide bar away from the first end of the second flexible item, by urging the ratchet tongue against the notch of the plurality of notches.

12. The method of claim 8, further comprising the step of:
rotating at least one of the first and second flexible items about the other of the first and second flexible items to form a connection between the first flexible item and the second flexible item within the tensioned overlapping region.

13. The method of claim 12, wherein the step of rotating the at least one of the first and second flexible items about the other of the first and second flexible items comprises providing additional tension to the first and second flexible items.

14. The method of claim 12, wherein the step of rotating the at least one of the first and second flexible items about the other of the first and second flexible items comprises:
engaging the first flexible item and the second flexible item with a lever at the overlapping region, wherein the lever comprises a first portion and a second portion;
rotating the lever to rotate the at least one of the first and second flexible items a first distance;
removing the second portion from the first portion for preventing contact between the lever and an object;
engaging the second portion with the first portion; and
rotating the lever to rotate the at least one of the first and second flexible items a second distance.

15. A method for connecting at least two flexible items, wherein each of said at least two flexible items comprises a first end and a second end, the method comprising the steps of:
engaging a first end of a first flexible item with a stationary clamping member;
engaging a first end of a second flexible item with a non-stationary clamping member movable relative to the stationary clamping member to form an untensioned overlapping region between the stationary clamping member and the non-stationary clamping member;
moving the non-stationary clamping member away from the stationary clamping member to move the first end of the second flexible item away from the first end of the first flexible item to apply tension to the first flexible item and the second flexible item and form a tensioned overlapping region between the stationary clamping member and the non-stationary clamping member; and
rotating the at least one of the first and second flexible items about the other of the first and second flexible items within the tensioned overlapping region to form a connection between the first flexible item and the second flexible item.

16. The method of claim 15, wherein the step of moving the non-stationary clamping member away from the stationary clamping member comprises:
engaging a ratchet tongue of a non-stationary clamping member connected to the first end of the first flexible item with a notch of a plurality of notches along a guide bar; and
moving the non-stationary clamping member away from the first end of the second flexible item, by urging the ratchet tongue against the notch of the plurality of notches.

17. The method of claim 15, further comprising the steps of:
placing the first flexible item within a first line guide mounted on the non-stationary clamping member; and
placing the second flexible item within a second line guide mounted in close proximity to the stationary clamping member.

18. The method of claim 17, wherein the step of moving the non-stationary clamping member relative to the stationary clamping member comprises:
moving at least one of the first line guide and the first flexible item in an axial direction relative to the other of the first line guide and the first flexible item;
contacting the first flexible item within the first line guide to counter torque produced by the first flexible item during application of tension to the first flexible item; and
contacting the second flexible item with the second line guide to counter torque produced by the second flexible item during application of tension to the second flexible item, thereby preventing relative rotational movement between the stationary clamping member and the non-stationary clamping member by.

* * * * *